US012798675B2

(12) United States Patent
Nakade et al.

(10) Patent No.: US 12,798,675 B2
(45) Date of Patent: Nov. 17, 2026

(54) STEERING SYSTEM

(71) Applicant: JTEKT CORPORATION, Kariya (JP)

(72) Inventors: Tomohiro Nakade, Sakurai (JP); Tsutomu Tamura, Nara (JP); Robert Fuchs, Nara (JP); Jurg Schiffmann, Bern (CH)

(73) Assignee: JTEKT CORPORATION, Kariya (JP)

( * ) Notice: Subject to any disclaimer, the term of this patent is extended or adjusted under 35 U.S.C. 154(b) by 264 days.

(21) Appl. No.: 18/707,754

(22) PCT Filed: Nov. 10, 2021

(86) PCT No.: PCT/JP2021/041371
§ 371 (c)(1),
(2) Date: May 6, 2024

(87) PCT Pub. No.: WO2023/084646
PCT Pub. Date: May 19, 2023

(65) Prior Publication Data
US 2026/0159159 A1 Jun. 11, 2026

(51) Int. Cl.
*B62D 15/02* (2006.01)
*B62D 5/04* (2006.01)
*B62D 6/00* (2006.01)

(52) U.S. Cl.
CPC ......... *B62D 15/025* (2013.01); *B62D 5/0463* (2013.01); *B62D 6/006* (2013.01); *B62D 6/007* (2013.01)

(58) Field of Classification Search
CPC ...... B62D 5/0463; B62D 6/002; B62D 6/003; B62D 6/008; B62D 15/025
(Continued)

(56) References Cited

U.S. PATENT DOCUMENTS 6,212,453 B1 * 4/2001 Kawagoe ............. B62D 5/0463 701/28
2002/0013647 A1 * 1/2002 Kawazoe ........ B60W 30/18145 180/443
(Continued)

FOREIGN PATENT DOCUMENTS

CN 106029476 A 10/2016
CN 110027609 A 7/2019
(Continued)

OTHER PUBLICATIONS

Aug. 16, 2025 Office Action issued in Chinese Patent Application No. 202180104128.0.
(Continued)

*Primary Examiner* — Hai H Huynh
*Assistant Examiner* — Johnny H Hoang
(74) *Attorney, Agent, or Firm* — Oliff PLC

(57) ABSTRACT

A steering system includes: an electric motor for steering angle control; a manual steering angle command value calculation unit that calculates a manual steering angle command value based on an equation of motion including steering torque and a reaction force control gain; an integrated angle command value calculation unit that calculates an integrated angle command value by adding the manual steering angle command value to an automatic steering angle command value for driver assistance; a control unit that performs angle control of the electric motor based on the integrated angle command value; and a reaction force control gain setting unit that sets the reaction force control gain using the steering torque, vehicle information, and road information.

6 Claims, 9 Drawing Sheets

(58) Field of Classification Search
USPC .................................................... 701/41–89
See application file for complete search history.

(56) References Cited

U.S. PATENT DOCUMENTS

| | | | | |
|---|---|---|---|---|
| 2002/0125063 | A1* | 9/2002 | Kurishige ............ | B62D 5/0466 180/443 |
| 2008/0114515 | A1* | 5/2008 | Hara .................... | B62D 5/0466 701/42 |
| 2010/0138112 | A1 | 6/2010 | Suzuki et al. | |
| 2016/0001810 | A1* | 1/2016 | Tsubaki ................... | B62D 6/08 701/42 |
| 2016/0347311 | A1 | 12/2016 | Kurata | |
| 2019/0161112 | A1 | 5/2019 | Ito et al. | |
| 2019/0248412 | A1 | 8/2019 | Wilhelm et al. | |
| 2019/0329818 | A1 | 10/2019 | Shoji et al. | |
| 2020/0039576 | A1 | 2/2020 | Shoji | |
| 2020/0269906 | A1* | 8/2020 | Nakade ................ | B62D 5/0463 |
| 2020/0339184 | A1 | 10/2020 | Matsuo et al. | |
| 2020/0398893 | A1* | 12/2020 | Shoji ...................... | B62D 6/002 |
| 2021/0078573 | A1 | 3/2021 | Kashiwamura | |
| 2022/0017143 | A1* | 1/2022 | Shoji .................... | B62D 15/025 |
| 2022/0063713 | A1* | 3/2022 | Shoji ...................... | B62D 6/002 |

FOREIGN PATENT DOCUMENTS

| | | | |
|---|---|---|---|
| CN | 111278715 | A | 6/2020 |
| CN | 111587199 | A | 8/2020 |
| JP | H10-217988 | A | 8/1998 |
| JP | 2005-112044 | A | 4/2005 |
| JP | 2008-273439 | A | 11/2008 |
| JP | 2011-073530 | A | 4/2011 |
| JP | 2011-121444 | A | 6/2011 |
| JP | 2017-114324 | A | 6/2017 |
| JP | 2019-194059 | A | 11/2019 |
| JP | 2020-019346 | A | 2/2020 |
| JP | 2021-000950 | A | 1/2021 |

OTHER PUBLICATIONS

Feb. 1, 2022 Search Report issued in International Patent Application No. PCT/JP2021/041371.

Oct. 8, 2024 extended Search Report issued in European Patent Application No. 21964005.9.

* cited by examiner

STEERING SYSTEM

TECHNICAL FIELD

The present invention relates to steering systems.

BACKGROUND ART

Patent Document 1 below discloses a motor control device including: a manual steering command value calculation unit that calculates a manual steering command value using steering torque; an integrated angle command value calculation unit that calculates an integrated angle command value by adding the manual steering command value to an automatic steering command value; and a control unit that performs angle control on an electric motor based on the integrated angle command value.

RELATED ART DOCUMENTS

Patent Documents

Patent Document 1: Japanese Unexamined Patent Application Publication No. 2019-194059 (JP 2019-194059 A)

SUMMARY OF THE INVENTION

Problem to be Solved by the Invention

A motor control device described in Patent Document 1 cannot perform steering control that sufficiently reflects driver's intentions when in a driver assist mode.

It is an object of the present invention to provide a steering system that can perform steering control that sufficiently reflects driver's intentions when in a driver assist mode.

Means for Solving the Problem

An embodiment of the present invention provides a steering system including: an electric motor for steering angle control; a manual steering angle command value calculation unit that calculates a manual steering angle command value based on an equation of motion including steering torque and a reaction force control gain; an integrated angle command value calculation unit that calculates an integrated angle command value by adding the manual steering angle command value to an automatic steering angle command value for driver assistance; a control unit that performs angle control on the electric motor based on the integrated angle command value; and a reaction force control gain setting unit that sets the reaction force control gain using the steering torque, vehicle information, and road information.

With this configuration, it is possible to perform steering control that sufficiently reflects driver's intentions when in a driver assist mode.

The above and other objects, features, and effects of the present invention will become apparent from the following description of an embodiment that will be given with reference to the accompanying drawings.

MODES FOR CARRYING OUT THE INVENTION

Description of Embodiment of Invention

Figure 1:
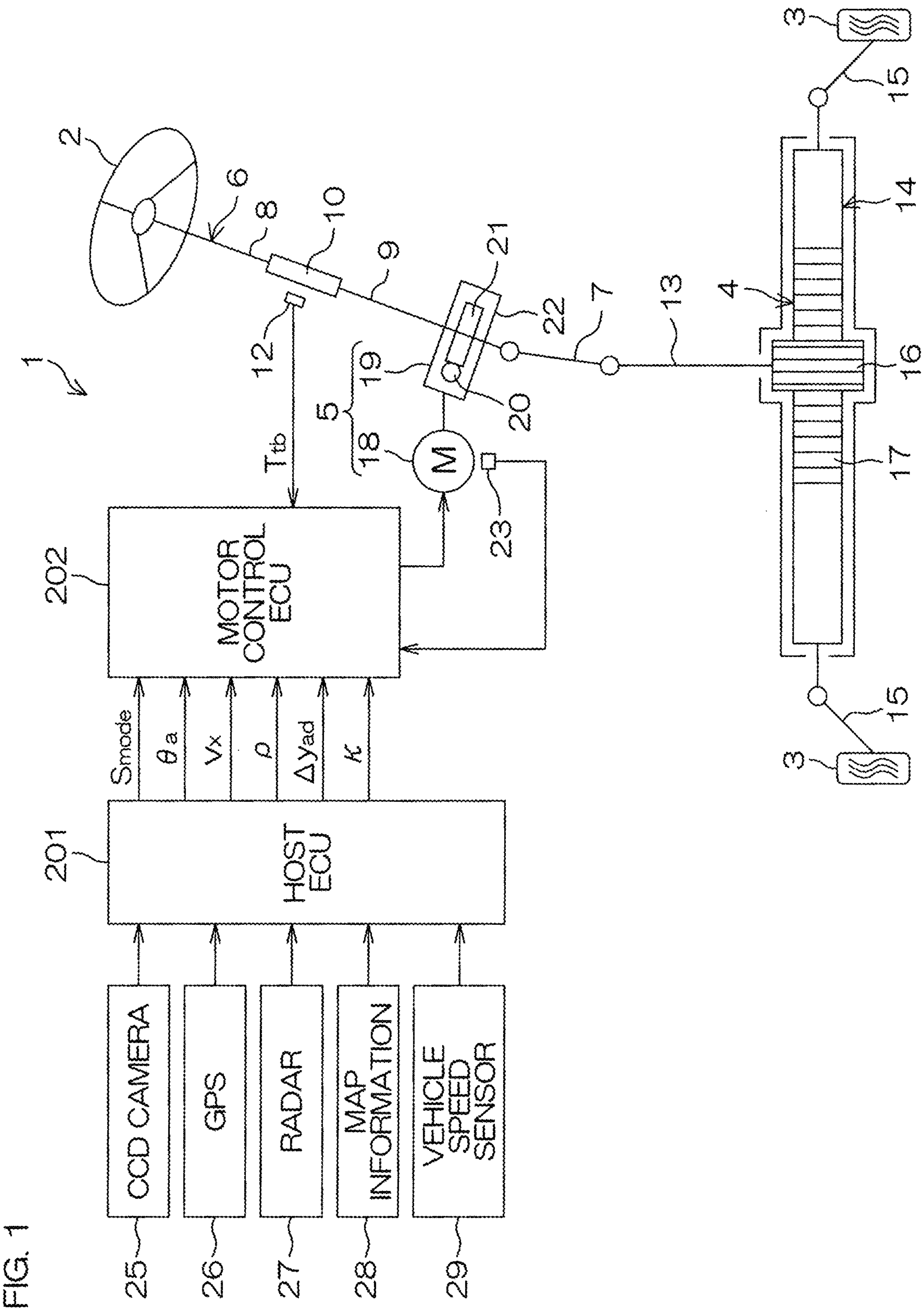
FIG. 1 is a schematic diagram showing a schematic configuration of an electric power steering system to which a steering system according to an embodiment of the present invention is applied.

An embodiment of the present invention provides a steering system including: an electric motor for steering angle control; a manual steering angle command value calculation unit that calculates a manual steering angle command value based on an equation of motion including steering torque and a reaction force control gain; an integrated angle command value calculation unit that calculates an integrated angle command value by adding the manual steering angle command value to an automatic steering angle command value for driver assistance; a control unit that performs angle control on the electric motor based on the integrated angle command value; and a reaction force control gain setting unit that sets the reaction force control gain using the steering torque, vehicle information, and road information.

With this configuration, it is possible to perform steering control that sufficiently reflects driver's intentions when in a driver assist mode.

In one embodiment of the present invention, the reaction force control gain setting unit includes: a driver target steering angle estimation unit that estimates a driver target steering angle using the steering torque, the vehicle information, and the road information; and a reaction force control gain calculation unit that calculates the reaction force control gain using the driver target steering angle.

In one embodiment of the present invention, the reaction force control gain setting unit includes: a driver target steering angle estimation unit that estimates a driver target steering angle using the steering torque, the vehicle information, and the road information; a driver torque control gain estimation unit that estimates a driver torque control gain using the driver target steering angle, the steering torque, and a rotation angle of the electric motor; and a reaction force control gain calculation unit that calculates the reaction force control gain using the driver torque control gain.

In one embodiment of the present invention, the vehicle information is a vehicle speed, and the road information is a curvature of a road.

In one embodiment of the present invention, the steering system further includes a route change unit that changes a target travel route for use in calculation of the automatic steering angle command value using the steering torque or the manual steering angle command value and the vehicle information.

In one embodiment of the present invention, the route change unit includes: a driver target lateral deviation calculation unit that calculates a driver target lateral deviation after a predetermined time using the steering torque or the manual steering angle command value and the vehicle information; a modified travel route generation unit that generates a modified travel route using the driver target lateral deviation and a lateral deviation after the predetermined time from a visual information-based target travel route; and a target travel route generation unit that generates a final target travel route by modifying the visual information-based target travel route based on the modified travel route.

In one embodiment of the present invention, the vehicle information is a vehicle speed and a current lateral deviation from a visual information-based target travel route.

Detailed Description of Embodiment of Invention

An embodiment of the present invention will be described in detail below with reference to the accompanying drawings.

FIG. 1 is a schematic diagram illustrating a schematic configuration of an electric power steering system to which a motor control device according to an embodiment of the present invention is applied.

An electric power steering system 1 includes: a steering wheel 2 that is a steering member for steering a vehicle; a steering operation mechanism 4 that steers steered wheels 3 according to rotation of the steering wheel 2; and a steering assist mechanism 5 that assists a driver in steering. The steering wheel 2 and the steering operation mechanism 4 are mechanically connected via a steering shaft 6 and an intermediate shaft 7.

The steering shaft 6 includes an input shaft 8 connected to the steering wheel 2 and an output shaft 9 connected to the intermediate shaft 7. The input shaft 8 and the output shaft 9 are connected via a torsion bar 10 so as to be rotatable relative to each other.

A torque sensor 12 is disposed near the torsion bar 10. The torque sensor 12 detects torsion bar torque $T_{tb}$ applied to the steering wheel 2, based on the amount of relative rotational displacement between the input shaft 8 and the output shaft 9. In the present embodiment, the torsion bar torque $T_{tb}$ is detected by the torque sensor 12 such that, for example, the torque for steering to the left is detected as a positive value and the torque for steering to the right is detected as a negative value. It is herein assumed that the magnitude of the torsion bar torque $T_{tb}$ increases as its absolute value increases. The torsion bar torque $T_{tb}$ is an example of the "steering torque" according to the present invention.

The steering operation mechanism 4 is a rack and pinion mechanism including a pinion shaft 13 and a rack shaft 14 that is a steered shaft. The steered wheels 3 are connected to the ends of the rack shaft 14 via tie rods 15 and knuckle arms (not shown). The pinion shaft 13 is connected to the intermediate shaft 7. The pinion shaft 13 is configured to rotate according to steering of the steering wheel 2. A pinion 16 is connected to a distal end of the pinion shaft 13.

The rack shaft 14 extends linearly in the right-left direction of the vehicle. A rack 17 that meshes with the pinion 16 is formed on an intermediate portion in the axial direction of the rack shaft 14. The pinion 16 and the rack 17 convert rotation of the pinion shaft 13 to axial movement of the rack shaft 14. The steered wheels 3 can be steered by moving the rack shaft 14 in the axial direction.

When the steering wheel 2 is steered (rotated), this rotation is transmitted to the pinion shaft 13 via the steering shaft 6 and the intermediate shaft 7. Rotation of the pinion shaft 13 is converted to axial movement of the rack shaft 14 by the pinion 16 and the rack 17. The steered wheels 3 are thus steered.

The steering assist mechanism 5 includes an electric motor 18 that generates a steering assist force (assist torque), and a speed reducer 19 that amplifies output torque of the electric motor 18 and transmits the amplified torque to the steering operation mechanism 4. The speed reducer 19 is a worm gear mechanism including a worm gear 20 and a worm wheel 21 that meshes with the worm gear 20. The speed reducer 19 is housed in a gear housing 22 that is a transmission mechanism housing.

Hereinafter, the reduction ratio (gear ratio) of the speed reducer 19 is sometimes represented by N. The reduction ratio N is defined as the ratio ($\theta_{wg}/\theta_{ww}$) of a worm gear angle $\theta_{wg}$ that is the rotation angle of the worm gear 20 to a worm wheel angle $\theta_{ww}$ that is the rotation angle of the worm wheel 21.

The worm gear 20 is rotationally driven by the electric motor 18. The worm wheel 21 is connected to the output shaft 9 so as to be rotatable with the output shaft 9.

When the worm gear 20 is rotationally driven by the electric motor 18, the worm wheel 21 is rotationally driven so that motor torque is applied to the steering shaft 6 and the steering shaft 6 (output shaft 9) is rotated. The rotation of the steering shaft 6 is transmitted to the pinion shaft 13 via the intermediate shaft 7. Rotation of the pinion shaft 13 is converted to axial movement of the rack shaft 14. The steered wheels 3 are thus steered. That is, rotationally driving the worm gear 20 by the electric motor 18 allows steering assistance by the electric motor 18 and steering of the steered wheels 3. The electric motor 18 is provided with a rotation angle sensor 23 for detecting the rotation angle of a rotor of the electric motor 18.

The torque that is applied to the output shaft 9 (example of an object to be driven by the electric motor 18) includes motor torque from the electric motor 18 and disturbance torque $T_{lc}$ other than the motor torque. The disturbance torque $T_{lc}$ other than the motor torque includes the torsion bar torque $T_{tb}$, road load torque (road reaction torque) $T_{rl}$, and friction torque $T_f$.

The torsion bar torque $T_{tb}$ is torque that is applied from the steering wheel 2 side to the output shaft 9 due to a force that is applied to the steering wheel 2 by the driver, a force that is generated by steering inertia, etc.

The road load torque $T_{rl}$ is torque that is applied from the steered wheel 3 side to the output shaft 9 via the rack shaft 14 due to self-aligning torque that is generated by a tire, a force that is generated by a suspension and tire wheel alignment, a friction force of the rack and pinion mechanism, etc.

The vehicle is equipped with a CCD (Charge Coupled Device) camera 25 that captures an image of the road ahead in the direction of travel of the vehicle, a GPS (Global Positioning System) 26 that detects the location of the vehicle, a radar 27 that detects a road shape and obstacles, a map information memory 28 storing map information, a vehicle speed sensor 29 that detects a vehicle speed $v_x$, etc.

The CCD camera 25, the GPS 26, the radar 27, the map information memory 28, and the vehicle speed sensor 29 are connected to a host ECU (ECU: Electronic Control Unit) 201 that performs driver assistance control. The host ECU 201 performs surrounding environment perception, vehicle self-localization, route planning, etc. based on information obtained by the CCD camera 25, the GPS 26, the radar 27, and the vehicle speed sensor 29 and the map information, and determines control target values for steering and drive actuators.

In the present embodiment, the driving mode includes a normal mode and a driver assist mode. In the present embodiment, when in the driver assist mode, the host ECU 201 generates an automatic steering angle command value $\theta_a$ for the driver assist mode, based on a driver target lateral deviation $\Delta y_{md}$ provided from a motor control ECU 202 in addition to the information obtained by the CCD camera 25, the GPS 26, the radar 27, and the vehicle speed sensor 29 and the map information. In the present embodiment, driver assistance is lane centering assist (LCA) for automatically keep the vehicle in the center of its lane (lane center). The automatic steering angle command value $\theta_a$ is a target value of the steering angle (in the present embodiment, the rotation angle of the pinion shaft 13) for keeping the vehicle centered in its lane.

When in the driver assist mode, the host ECU 201 also generates the vehicle speed $v_x$, a radius of curvature p of the road, a lateral deviation $\Delta y_{md}$ after a predetermined time from a visual information-based target travel route, and a weighting factor κ to be used in a reaction force control gain calculation unit 55 described later (see FIG. 2). The visual information-based target travel route is a target travel route that is generated mainly based on visual information obtained by the CCD camera 25 in order to keep the vehicle centered in its lane. The host ECU 201 also generates a mode signal $S_{mode}$ indicating whether the driving mode is the normal mode or the driver assist mode. The mode signal $S_{mode}$, the automatic steering angle command value $\theta_a$, the vehicle speed $v_x$, the radius of curvature ρ, the lateral deviation $\Delta y_{md}$, and the weighting factor κ are provided to the motor control ECU 202 via an in-vehicle network.

The torsion bar torque $T_{tb}$ detected by the torque sensor 12 and an output signal from the rotation angle sensor 23 are input to the motor control ECU 202. The motor control ECU 202 controls the electric motor 18 based on these input signals and information provided from the host ECU 201.

Figure 2:
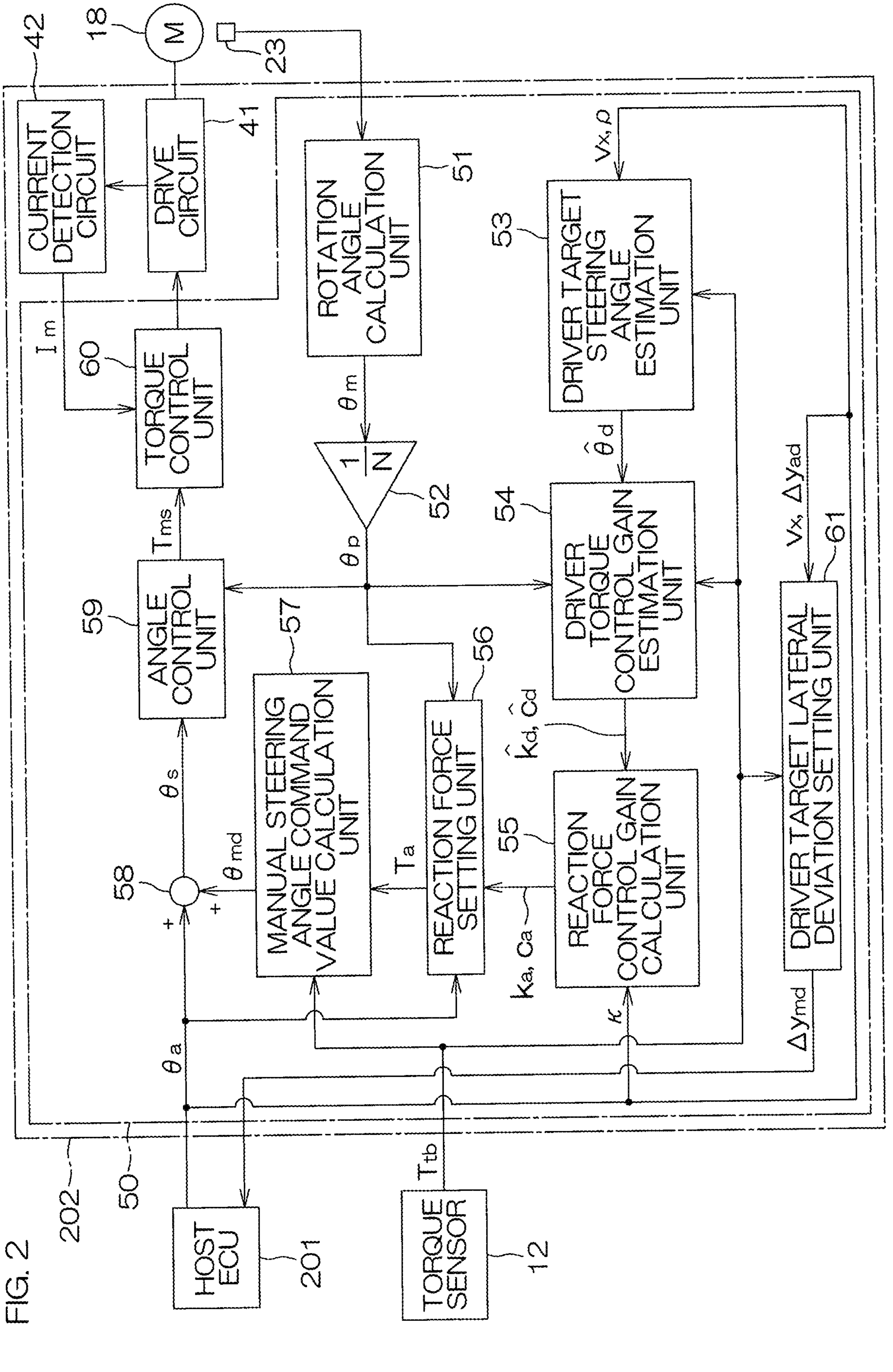
FIG. 2 is a block diagram illustrating an electrical configuration of a motor control ECU.

FIG. 2 is a block diagram showing an electrical configuration of the motor control ECU 202.

The operation when the driving mode is the driver assist mode will be mainly described below.

The motor control ECU 202 includes a microcomputer 50, a drive circuit (inverter circuit) 41 that is controlled by the microcomputer 50 and supplies electric power to the electric motor 18, and a current detection circuit 42 that detects a current flowing through the electric motor 18 (hereinafter referred to as "motor current $I_m$").

The microcomputer 50 includes a CPU and a memory (ROM, RAM, nonvolatile memory, etc.), and functions as a plurality of functional processing units by executing a predetermined program. The plurality of functional processing units includes a rotation angle calculation unit 51, a reduction ratio division unit 52, a driver target steering angle estimation unit 53, a driver torque control gain estimation unit 54, a reaction force control gain calculation unit 55, a reaction force setting unit 56, a manual steering angle command value calculation unit 57, an integrated angle command value calculation unit 58, an angle control unit 59, a torque control unit 60, and a driver target lateral deviation setting unit 61.

In the present embodiment, the driver target steering angle estimation unit 53, the driver torque control gain estimation unit 54, and the reaction force control gain calculation unit 55 constitute the "reaction force control gain setting unit" of the present invention.

The rotation angle calculation unit 51 calculates a rotation angle (rotor rotation angle) Om of the rotor of the electric motor 18 based on the output from the rotation angle sensor 23. The reduction ratio division unit 52 converts the rotor rotation angle $\theta_m$ calculated by the rotation angle calculation unit 51 to a pinion angle (steering angle) $\theta_p$ that is a rotation angle of the pinion shaft 13 by dividing the rotor rotation angle $\theta_m$ by the reduction ratio N.

The driver target steering angle estimation unit 53 estimates a steering angle according to the direction in which the driver intends to move (hereinafter referred to as "driver target steering angle $\theta_d$"), based on the torsion bar torque $T_{tb}$ and the vehicle speed $v_x$ and radius of curvature p provided from the host ECU 201. The estimated value of $\theta_d$ will be herein represented by $\hat{}\theta_d$.

The driver target steering angle $\hat{}\theta_d$ is calculated based on the following expression (1).

[Math 1]

$$\hat{\theta}_d = \theta_{env} + \theta_{int} \tag{1}$$

$$\theta_{env} = R_s\left(1 - \frac{M}{2(l_f + l_r)^2}\frac{l_f C_f - l_r C_r}{C_f C_r}v_x^2\right)(l_f + l_r)\frac{1}{\rho}$$

$$\theta_{int} = \int\int_t^{t+\Delta t}\frac{T_{tb}}{J_{sw}}dt$$

Each symbol in expression (1) is defined as follows.

$\theta_{env}$: steering angle required to follow a target travel route according to the road shape (curvature=1/ρ)

$\theta_{int}$: steering angle according to driver input $R_s$: over-roll gear ratio (ratio of the rotation angle of the steering wheel 2 to the steered angle of the steered wheels 3)

M: vehicle weight $l_f$: distance in the front-rear direction of the vehicle from the center of gravity of the vehicle to a front wheel axle $l_r$: distance in the front-rear direction of the vehicle from the center of gravity of the vehicle to a rear wheel axle $C_f$: front wheel cornering stiffness $C_r$: rear wheel cornering stiffness $J_{sw}$: inertia of the steering wheel 2 t: current time

Δt: predetermined time

The driver torque control gain estimation unit 54 estimates driver torque control gains $k_d$, $c_d$ based on the driver target steering angle $\hat{}\theta_d$, the pinion angle $\theta_p$, and the torsion bar torque $T_{tb}$.

In the present embodiment, it is assumed that driver torque $T_d$, is given by the following expression (2). The driver torque $T_d$ is torque input from the driver to the steering wheel 2.

[Math 2]

$$T_d = -k_d(\theta_{sw} - \theta_d) - c_d(\dot{\theta}_{sw} - \dot{\theta}_d) \tag{2}$$

In expression (2), $\theta_d$ is the driver target steering angle, and $\theta_{sw}$ is the rotation angle of the steering wheel 2. $k_d$ is a spring constant for defining the driver torque, and $c_d$ is a viscous damping coefficient for defining the driver torque. $k_d$ and $c_d$ are control gains for defining the driver torque. That is, in the present embodiment, it is assumed that the driver target steering angle $\theta_d$ is followed by the driver torque control gains $k_d$, $c_d$.

The driver torque control gain estimation unit 54 estimates the driver torque control gains $k_d$, $c_d$ using Kalman filter state equation given by the following expression (3) and Kalman filter observation equation given by the following expression (4). The estimated values of $k_d$ and $c_d$ will be herein represented by $\hat{k}_d$ and $\hat{c}_d$.

[Math 3]

$$\dot{\hat{x}}_d = A_d\hat{x}_d + B_d u_d + K(y - \hat{y}) \tag{3}$$

$$x_d = \begin{bmatrix}\theta_{sw} & \dot{\theta}_{sw} & \theta_d & \dot{\theta}_d & k_d & c_d\end{bmatrix}',\ u_d = \theta_p$$

$$A_d = \begin{bmatrix} 0 & 1 & 0 & 0 & 0 & 0 \\ a_{21} & a_{22} & a_{23} & a_{24} & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix},\ B_d = \begin{bmatrix} 0 \\ b_{21} \\ 0 \\ 0 \\ 0 \\ 0 \end{bmatrix}$$

$$a_{21} = -(k_d + K_{tb})J_{sw}^{-1},\ a_{22} = -c_d J_{sw}^{-1},$$

$$a_{23} = k_d J_{sw}^{-1},\ a_{24} = c_d J_{sw}^{-1},\ b_{21} = K_{tb} J_{sw}^{-1},$$

[Math 4]

$$y_1 = \begin{bmatrix} T_{tb} \\ \theta_d \\ \dot{\theta}_d \end{bmatrix} = C_1 x_d + D_1 u_d \tag{4}$$

$$C_1 = \begin{bmatrix} K_{tb} & 0 & 0 & 0 & 0 & 0 \\ 0 & 0 & 1 & 0 & 0 & 0 \\ 0 & 0 & 0 & 1 & 0 & 0 \end{bmatrix},\ D_1 = \begin{bmatrix} -K_{tb} \\ 0 \\ 0 \end{bmatrix}$$

In expression (3), K is a Kalman filter gain, and $K_{tb}$ is the stiffness of the torsion bar 10.

The reaction force control gain calculation unit 55 calculates reaction force control gains $k_a$, $c_a$ for defining a steering reaction force to the driver, based on the driver torque control gains $\hat{k}_d$, $\hat{c}_d$ and the weighting factor κ provided from the host ECU 201. $k_a$ is a spring constant for defining the steering reaction force to the driver, and $c_d$ is a viscous damping coefficient for defining the steering reaction force to the driver.

The reaction force control gain calculation unit 55 calculates the reaction force control gains $k_a$, $c_a$ based on the following expression (5).

[Math 5]

$$k_a = k_a, st - \kappa\hat{k}d \tag{5}$$

$$c_a = c_a, st - \kappa\hat{c}_d$$

In expression (5), $k_{a,st}$ is a preset reference value of the spring constant $k_a$. $c_{a,st}$ is a preset reference value of the viscous damping coefficient $c_a$.

The weighting factor κ is set based on the situation in the surroundings etc. The weighting factor κ is set to, for example, 1, 0, or −1.

When κ=1, the reaction force control gains $k_a$, $c_a$ decrease as the driver torque control gains $\hat{k}_d$, $\hat{c}_d$ increase. In this case, it becomes easier for the driver to perform steering. For example, the host ECU 201 sets κ to 1 in a situation where the risk is low even if the driver performs steering. In such a case, the host ECU 201 need not necessarily set κ to 1, and may be set κ to a value of more than 1.

When κ=0, the reaction force control gains $k_a$, $c_a$ are constant values regardless of the values of the driver torque control gains $\hat{k}_d$, $\hat{c}_d$.

When κ=−1, the reaction force control gains $k_a$, $c_a$ also increase as the driver torque control gains $\hat{k}_d$, $\hat{c}_d$ increase. In this case, the priority of control is given to driver assistance that does not allow steering intervention by the driver. For example, the host ECU 201 sets κ to −1 in a situation where the risk is high if the driver performs steering. In such a case, the host ECU 201 need not necessarily set κ to −1, and may be set κ to a value of less than −1.

The reaction force setting unit 56 sets a steering reaction force $T_a$ to the driver based on the reaction force control gains $k_d$, $c_d$, the pinion angle $\theta_p$, and the automatic steering angle command value $\theta_a$ provided from the host ECU 201. Specifically, the reaction force setting unit 56 sets the steering reaction force $T_a$ based on the following expression (6).

[Math 6]

$$T_a = -k_a(\theta_p - \theta_a) - c_a(\dot{\theta}_p - \dot{\theta}_a) \tag{6}$$

The steering reaction force $T_a$ is 0 when the pinion angle $\theta_p$ is equal to the automatic steering angle command value $\theta_a$. The absolute value of the steering reaction force $T_a$ increases as the absolute value of the difference between the pinion angle $\theta_p$ and the automatic steering angle command value $\theta_a$ increases.

The manual steering angle command value calculation unit 57 is provided to, when the driver operates the steering wheel 2, set the steering angle (in the present embodiment, the rotation angle of the pinion shaft 13) according to the steering wheel operation as a manual steering angle command value $\theta_{md}$.

The manual steering angle command value calculation unit 57 calculates the manual steering angle command value $\theta_{md}$ based on the steering reaction force $T_a$, the torsion bar torque $T_{tb}$, and column inertia Je in a single inertia model including a lower column (reference EPS model). Specifically, the manual steering angle command value calculation unit 57 calculates the manual steering angle command value $\theta_{md}$ by solving the differential equation given by the following expression (7).

[Math 7]

$$J_c \cdot \ddot{\theta}_{md} = T_{tb} + T_a \tag{7}$$

The integrated angle command value calculation unit 58 calculates an integrated angle command value $\theta_s$ by adding the manual steering angle command value $\theta_{md}$ to the automatic steering angle command value $\theta_a$.

The angle control unit 59 calculates an integrated motor torque command value $T_{ms}$ according to the integrated angle command value $\theta_s$, based on the integrated angle command value $\theta_s$. The angle control unit 59 will be described in detail later.

The torque control unit 60 drives the drive circuit 41 so that the motor torque of the electric motor 18 becomes closer to the motor torque command value $T_{ms}$.

The driver target lateral deviation setting unit 61 will be described later.

Figure 3:
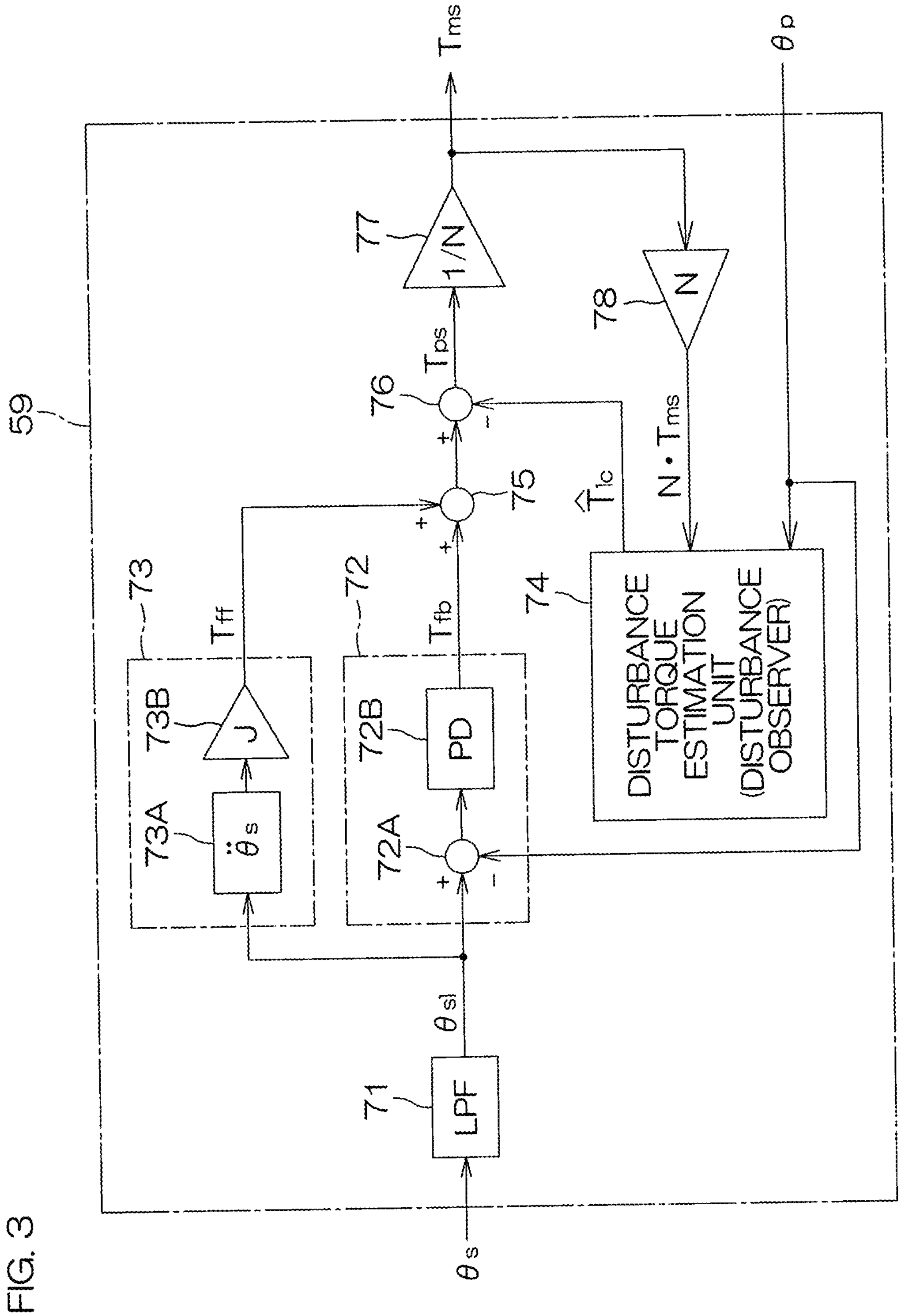
FIG. 3 is a block diagram showing the configuration of an angle control unit.

FIG. 3 is a block diagram showing the configuration of the angle control unit 59.

The angle control unit 59 calculates the integrated motor torque command value $T_{ms}$ based on the integrated angle command value $\theta_s$. The angle control unit 59 includes a low-pass filter (LPF) 71, a feedback control unit 72, a feedforward control unit 73, a disturbance torque estimation unit 74, a torque addition unit 75, a disturbance torque compensation unit 76, a reduction ratio division unit 77, and a reduction ratio multiplication unit 78.

The reduction ratio multiplication unit 78 multiplies the motor torque command value $T_{ms}$ calculated by the reduction ratio division unit 77 by the reduction ratio N of the speed reducer 19 to convert the motor torque command value $T_{ms}$ to a pinion shaft torque command value $N \cdot T_{ms}$ to be applied to the pinion shaft 13.

The low-pass filter 71 performs a low-pass filtering process on the integrated angle command value $\theta_s$. An integrated angle command value $\theta_{sl}$ resulting from the low-pass filtering process is provided to the feedback control unit 72 and the feedforward control unit 73.

The feedback control unit 72 is provided to control the pinion angle $\theta_p$ so that the pinion angle $\theta_p$ becomes closer to the integrated angle command value $\theta_{sl}$ resulting from the low-pass filtering process. The feedback control unit 72 includes an angle deviation calculation unit 72A and a PD control unit 72B. The angle deviation calculation unit 72A calculates a deviation $\Delta\theta(=\theta_{sl}-\theta_p)$ between the integrated angle command value $\theta_{sl}$ and the pinion angle $\theta_p$. The angle deviation calculation unit 72A may calculate, as the angle deviation $\Delta\theta$, a deviation $(\theta_{sl}-\hat{\theta}_p)$ between the integrated angle command value $\theta_{sl}$ and an estimated steering angle value ^θp calculated by the disturbance torque estimation unit 74.

The PD control unit 72B calculates feedback control torque Tob by performing a PD calculation (proportional-derivative calculation) on the angle deviation 40 calculated by the angle deviation calculation unit 72A. The feedback control torque Tob is provided to the torque addition unit 75.

The feedforward control unit 73 is provided to improve control response by compensating for a delay in response due to the inertia of the electric power steering system 1. The feedforward control unit 73 includes an angular acceleration calculation unit 73A and an inertia multiplication unit 73B. The angular acceleration calculation unit 73A calculates a target angular acceleration $d^2\theta_{sl}/dt^2$ by obtaining the second derivative of the integrated angle command value $\theta_{sl}$.

The inertia multiplication unit 73B calculates feedforward control torque $T_{ff}$ $(=J \cdot d^2\theta_{sl}/dt^2)$ by multiplying the target angular acceleration $d^2\theta_{sl}/dt^2$ calculated by the angular acceleration calculation unit 73A by the inertia J of the electric power steering system 1. The inertia J is obtained from, for example, a physical model of the electric power steering system 1 (see FIG. 4) that will be described later. The feedforward control torque $T_{ff}$ is provided to the torque addition unit 75 as an inertia compensation value.

The torque addition unit 75 calculates a basic torque command value $(T_{fb}+T_{ff})$ by adding the feedforward control torque $T_{ff}$ to the feedback control torque $T_{fb}$.

The disturbance torque estimation unit 74 is provided to estimate nonlinear torque (disturbance torque: torque other than the motor torque) that is generated as disturbance in a plant (controlled object of the electric motor 18). The disturbance torque estimation unit 74 estimates the disturbance torque (disturbance load) $T_{lc}$, the pinion angle $\theta_p$, and a pinion angle derivative value (angular velocity) $d\theta_p/dt$ based on the pinion shaft torque command value $N \cdot T_{ms}$ and the pinion angle $\theta_p$. The estimated values of the disturbance torque $T_{lc}$, pinion angle $\theta_p$, and pinion angle derivative value $d\theta_p/dt$ are represented by $\hat{T}_{lc}$, $\hat{\theta}_p$, and $d\hat{\theta}_p/dt$, respectively. The disturbance torque estimation unit 74 will be described in detail later.

The estimated disturbance torque value $\hat{T}_{lc}$ calculated by the disturbance torque estimation unit 74 is provided to the disturbance torque compensation unit 76 as a disturbance torque compensation value.

The disturbance torque compensation unit 76 calculates an integrated steering torque command value $T_{ps}$ $(=T_{fb}+T_{ff}-$^Tic) by subtracting the estimated disturbance torque value $\hat{T}_{lc}$ from the basic torque command value $(T_{fb}+T_{ff})$. The integrated steering torque command value $T_{ps}$ (torque command value for the pinion shaft 13) with the disturbance torque compensated for is thus obtained.

The integrated steering torque command value $T_{ps}$ is provided to the reduction ratio division unit 77. The reduction ratio division unit 77 calculates the integrated motor torque command value $T_{ms}$ by dividing the integrated steering torque command value $T_{ps}$ by the reduction ratio N. This integrated motor torque command value $T_{ms}$ is provided to the torque control unit 60 (see FIG. 2).

The disturbance torque estimation unit 74 will be described in detail. The disturbance torque estimation unit 74 is, for example, a disturbance observer that estimates the disturbance torque $T_{lc}$, the pinion angle $\theta_p$, and the pinion angular velocity dop/dt by using a physical model 101 of the electric power steering system 1 shown in FIG. 4.

This physical model 101 includes a plant (example of an object to be driven by the motor) 102 that includes the output shaft 9 and the worm wheel 21 fixed to the output shaft 9. The torsion bar torque $T_{tb}$ is applied from the steering wheel 2 to the plant 102 via the torsion bar 10, and the road load torque Tri is applied from the steered wheel 3 side to the plant 102.

Moreover, the pinion shaft torque command value $N \cdot T_{ms}$ is applied to the plant 102 via the worm gear 20, and the friction torque $T_f$ is applied to the plant 102 due to the friction between the worm wheel 21 and the worm gear 20.

An equation of motion for the inertia of the physical model 101 is given by the following expression (8), where J is the inertia of the plant 102.

[Math 8]

$$J\ddot{\theta}_p = N \cdot T_{ms} + T_{lc} \qquad (8)$$
$$T_{lc} = T_{tb} + T_{rl} + T_f$$

$d^2\theta_p/dt^2$ is the angular acceleration of the plant 102. N is the reduction ratio of the speed reducer 19. $T_{lc}$ represents the disturbance torque other than the motor torque that is applied to the plant 102. While the disturbance torque $T_{lc}$ is shown as the sum of the torsion bar torque $T_{tb}$, the road load torque $T_{rl}$, and the friction torque $T_f$ in the present embodiment, the disturbance torque $T_{lc}$ actually includes torque other than these.

Figure 4:
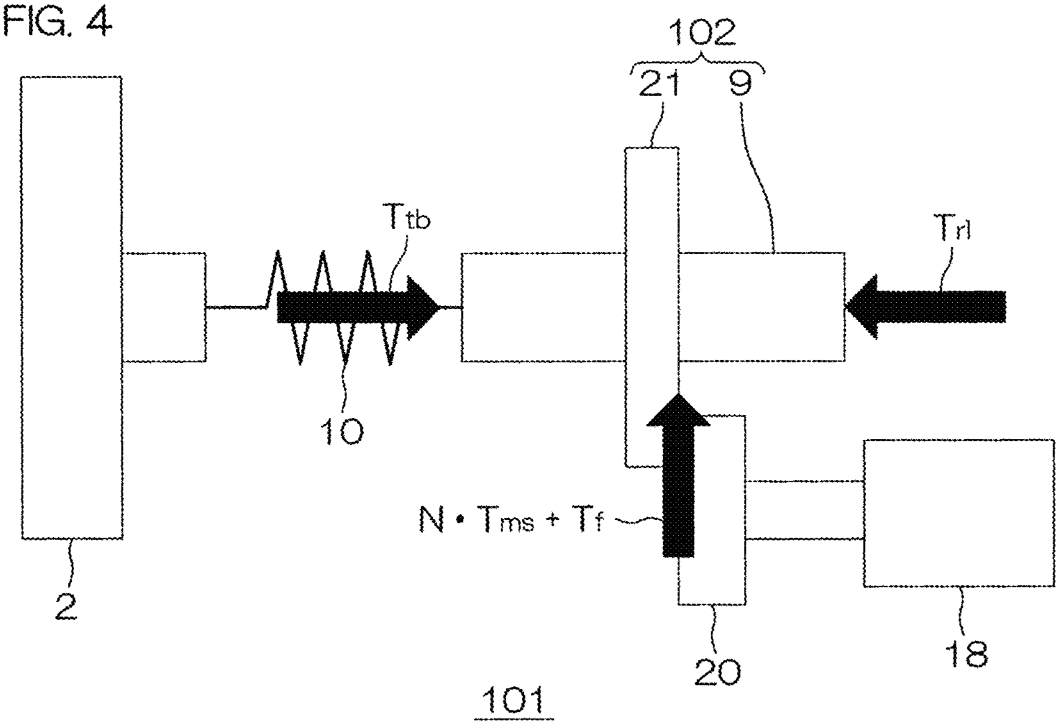
FIG. 4 is a schematic diagram showing an example of the configuration of a physical model of the electric power steering system.

An equation of state for the physical model 101 in FIG. 4 is given by the following expression (9).

[Math 9]

$$\begin{cases} \dot{x} = Ax + B_1 u_1 + B_2 u_2 \\ y = Cx + D u_1 \end{cases} \tag{9}$$

In expression (9), x is a state variable vector, $u_1$ is a known input vector, $u_2$ is an unknown input vector, and y is an output vector (measured value). In expression (9), A is a system matrix, $B_1$ is a first input matrix, $B_2$ is a second input matrix, C is an output matrix, and D is a direct feedthrough matrix.

The above equation of state is extended to a system including the unknown input vector $u_2$ as one of the states. An equation of state of the extended system (extended equation of state) is given by the following expression (10).

[Math 10]

$$\begin{cases} \dot{x} = A_e x_e + B_e u_1 \\ y = C_e x_e \end{cases} \tag{10}$$

In expression (10), $x_e$ is a state variable vector of the extended system, and is given by the following expression (11).

[Math 11]

$$x_e = \begin{bmatrix} x \\ u_2 \end{bmatrix} \tag{11}$$

In the above expression (10), $A_e$ is a system matrix of the extended system, $B_e$ is a known input matrix of the extended system, and $C_e$ is an output matrix of the extended system.

A disturbance observer (extended state observer) given by the equation of the following expression (12) is constructed from the extended equation of state given by the above expression (10).

[Math 12]

$$\begin{cases} \dot{\hat{x}}_e = A_e \hat{x}_e + B_e u_1 + L(y - \hat{y}) \\ \hat{y} = C_e \hat{x}_e \end{cases} \tag{12}$$

In expression (12), $\hat{}x_e$ represents an estimated value of $x_e$. L is an observer gain. $\hat{}y$ represents an estimated value of y. $\hat{}x_e$ is given by the following expression (13).

[Math 13]

$$\hat{x}_e = \begin{bmatrix} \hat{\theta}_p \\ \dot{\hat{\theta}}_p \\ \hat{T}_{lc} \end{bmatrix} \tag{13}$$

In expression (13), $\hat{}\theta_p$ is an estimated value of $\theta_p$, and $\hat{}T_{lc}$ is an estimated value of Tic.

The disturbance torque estimation unit 74 calculates the state variable vector $\hat{}x_e$ based on the equation of the above expression (12).

Figure 5:
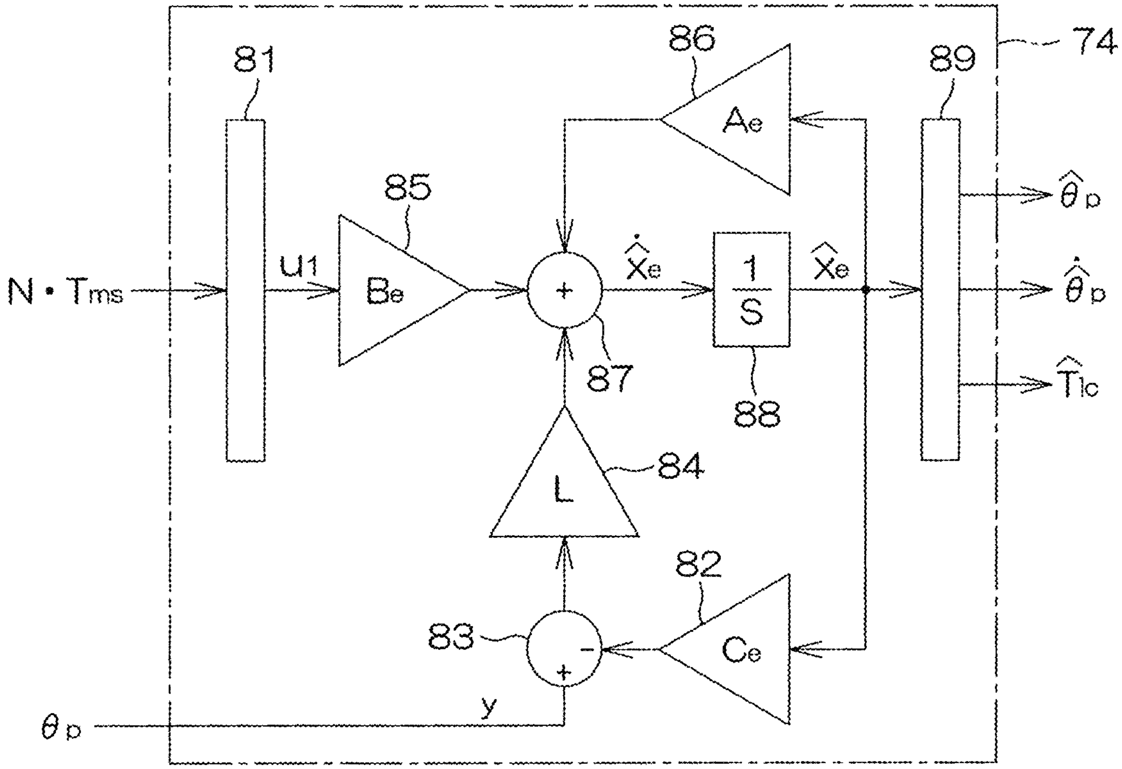
FIG. 5 is a block diagram showing the configuration of a disturbance torque estimation unit.

FIG. 5 is a block diagram showing the configuration of the disturbance torque estimation unit 74.

The disturbance torque estimation unit 74 includes an input vector input unit 81, an output matrix multiplication unit 82, a first addition unit 83, a gain multiplication unit 84, an input matrix multiplication unit 85, a system matrix multiplication unit 86, a second addition unit 87, an integration unit 88, and a state variable vector output unit 89.

The pinion shaft torque command value $N \cdot T_{ms}$ calculated by the reduction ratio multiplication unit 78 (see FIG. 3) is provided to the input vector input unit 81. The input vector input unit 81 outputs the input vector $u_1$.

The output of the integration unit 88 is the state variable vector $\hat{}x_e$ (see the above expression (13)). At the start of the calculation, an initial value is given as the state variable vector $\hat{}x_e$. The initial value of the state variable vector $\hat{}x_e$ is, for example, 0.

The system matrix multiplication unit 86 multiplies the state variable vector $\hat{}x_e$ by the system matrix $A_e$. The output matrix multiplication unit 82 multiplies the state variable vector $\hat{}x_e$ by the output matrix $C_e$.

The first addition unit 83 subtracts the output ($C_e \cdot \hat{}x_e$) of the output matrix multiplication unit 82 from the output vector (measured value) y that is the pinion angle $\theta_p$ calculated by the reduction ratio division unit 52 (see FIG. 2). That is, the first addition unit 83 calculates the difference ($y-\hat{}y$) between the output vector y and the estimated output vector value $\hat{}y$ ($=C_e \cdot \hat{}x_e$). The gain multiplication unit 84 multiplies the output ($y-\hat{}y$) of the first addition unit 83 by the observer gain L (see the above expression (12)).

The input matrix multiplication unit 85 multiplies the input vector $u_1$ output from the input vector input unit 81 by the input matrix $B_e$. The second addition unit 87 calculates a derivative value $d\hat{}x_e/dt$ of the state variable vector by adding the output ($Be \cdot u_1$) of the input matrix multiplication unit 85, the output ($A_e \cdot \hat{}x_e$) of the system matrix multiplication unit 86, and the output ($L(y-\hat{}y)$) of the gain multiplication unit 84. The integration unit 88 calculates the state variable vector $\hat{}x_e$ by integrating the output ($d\hat{}x_e/dt$) of the second addition unit 87. The state variable vector output unit 89 calculates the estimated disturbance torque value $\hat{}T_{lc}$, the estimated pinion angle value $\hat{}\theta_p$, and the estimated pinion angular velocity value $d\hat{}\theta_p/dt$, based on the state variable vector $\hat{}x_e$.

Unlike the extended state observer described above, a typical disturbance observer is composed of an inverse model of the plant and a low-pass filter. An equation of motion of the plant is given by the above expression (8) as described above. The inverse model of the plant is therefore given by the following expression (14).

[Math 14]

$$T_{lc} = J\ddot{\theta}_p - N \cdot T_{ms} \tag{14}$$

The inputs to the typical disturbance observer are $J \cdot d^2\theta_p/dt^2$ and $N \cdot T_{ms}$. Since the second derivative of the pinion angle $\theta_p$ is used, noise of the rotation angle sensor 23 has a great influence. On the other hand, the extended state observer of the above embodiment estimates the disturbance torque using an integral type. Therefore, the influence of noise due to differentiation can be reduced.

The typical disturbance observer composed of an inverse model of the plant and a low-pass filter may be used as the disturbance torque estimation unit 74.

Figure 6:
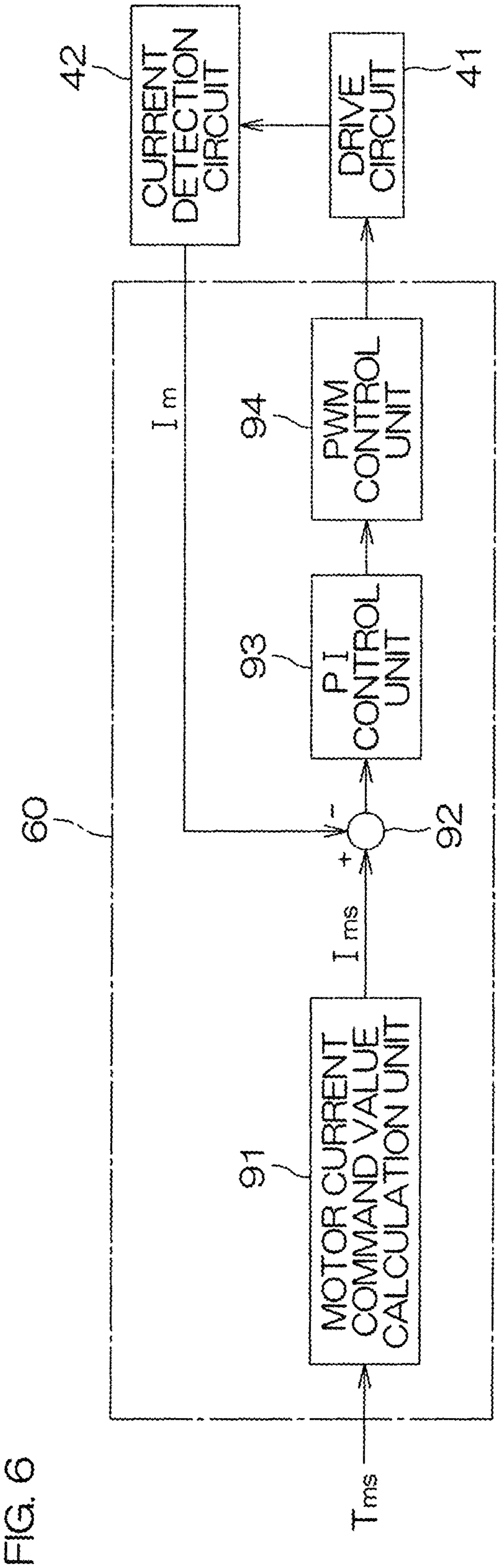
FIG. 6 is a schematic diagram showing the configuration of a torque control unit.

FIG. 6 is a schematic diagram showing the configuration of the torque control unit 60.

The torque control unit 60 (see FIG. 2) includes a motor current command value calculation unit 91, a current deviation calculation unit 92, a PI control unit 93, and a PWM (Pulse Width Modulation) control unit 94.

The motor current command value calculation unit 91 calculates a motor current command value $I_{ms}$ by dividing the motor torque command value $T_{ms}$ calculated by the angle control unit 59 (see FIG. 2) by a torque constant $K_t$ of the electric motor 18.

The current deviation calculation unit 92 calculates a deviation $\Delta I$ ($=I_{ms}-I_m$) between the motor current command value $I_{ms}$ obtained by the motor current command value calculation unit 91 and the motor current $I_m$ detected by the current detection circuit 42.

The PI control unit 93 generates a drive command value for controlling the motor current $I_m$ flowing through the electric motor 18 to the motor current command value $I_{ms}$ by performing a PI calculation (proportional-integral calculation) on the current deviation $\Delta I$ calculated by the current deviation calculation unit 92. The PWM control unit 94 generates a PWM control signal with a duty cycle corresponding to the drive command value, and supplies the PWM control signal to the drive circuit 41. As a result, electric power corresponding to the drive command value is supplied to the electric motor 18. The electric motor 18 is thus drivingly controlled so that the motor torque becomes equal to the motor torque command value $T_{ms}$.

The operation of the driver target lateral deviation setting unit 61 (see FIG. 2) and a method for generating a target travel route by the host ECU 201 will be described below.

The driver target lateral deviation setting unit 61 sets the driver target lateral deviation $\Delta y_{md}$, namely a lateral distance by which the driver intends to move before a predetermined time $t_s$ elapses from the current time $t_0$, based on the torsion bar torque $T_{tb}$ and the vehicle speed $V_x$ and current lateral deviation $\Delta y_{ad}$ from the visual information-based target travel route that are provided from the host ECU 201.

The current lateral deviation $\Delta y_{ad}$ from the visual information-based target travel route is the lateral distance between the visual information-based target travel route and a current vehicle reference location.

Figure 7:
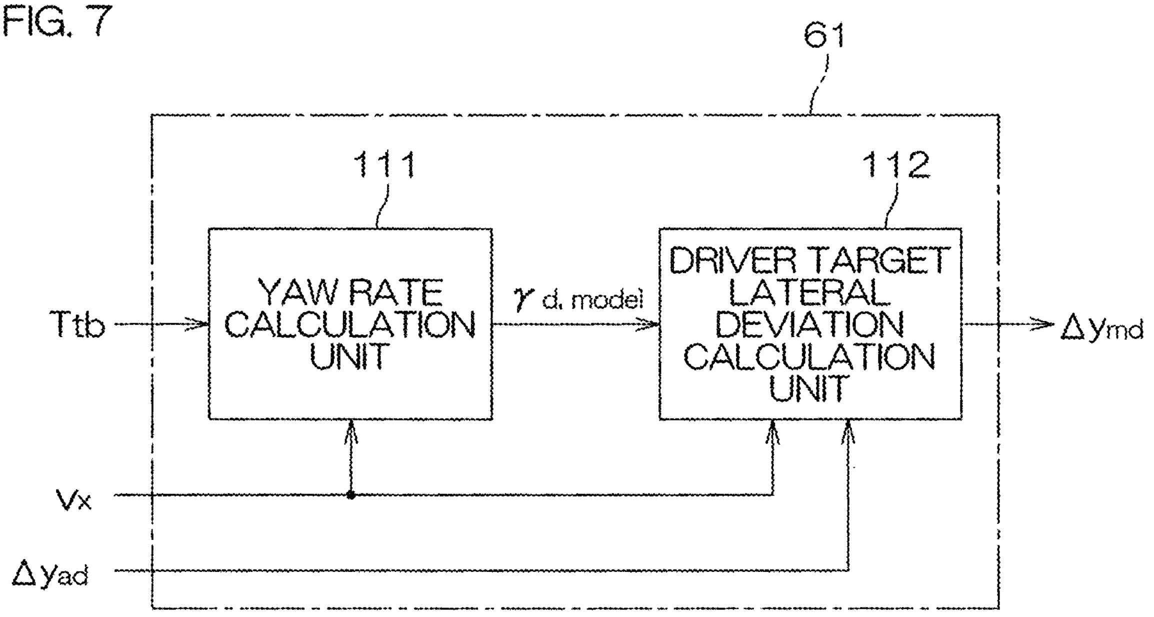
FIG. 7 is a block diagram showing the configuration of a driver target lateral deviation setting unit.

FIG. 7 is a block diagram showing the configuration of the driver target lateral deviation setting unit 61.

The driver target lateral deviation setting unit 61 (see FIG. 2) includes a yaw rate calculation unit 111 and a driver target lateral deviation calculation unit 112.

The yaw rate calculation unit 111 uses a vehicle model to calculate from the torsion bar torque $T_{tb}$ and the vehicle speed $v_x$ a yaw rate $\gamma_{d,model}$ that would be generated if the driver assistance were disenabled. The yaw rate calculation unit 111 may use the vehicle model to calculate from the manual steering angle command value $\theta_{md}$ and the vehicle speed $V_x$ the yaw rate $\gamma_{d,model}$ that is generated for the manual steering angle command value $\theta_{md}$.

Figure 8:
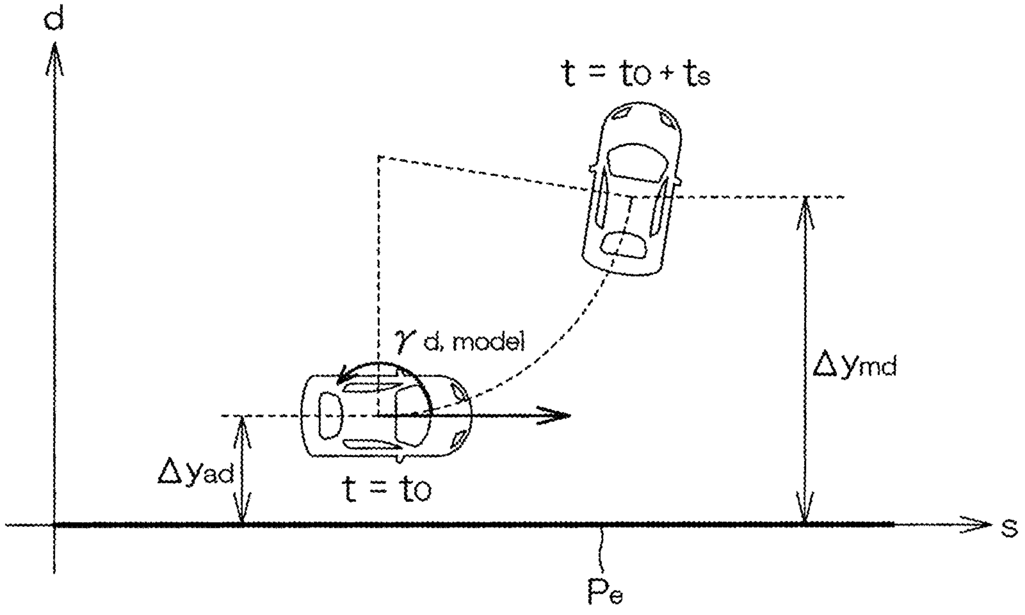
FIG. 8 is a schematic diagram illustrating the operation of a driver target lateral deviation calculation unit.

As shown in FIG. 8, the driver target lateral deviation calculation unit 112 calculates, as the driver target lateral deviation $\Delta y_{md}$, the distance by which the vehicle would be moved in the lateral direction if the vehicle speed $v_x$ and the yaw rate $\gamma_{d,model}$ were constant and the vehicle had been driven in a steady circular turn for $t_s$ seconds. In FIG. 8, the s-axis (abscissa) indicates the location in a direction (longitudinal direction) along a visual information-based target travel route Pe, and the d-axis (ordinate) indicates the location in a direction (lateral direction) perpendicular to the direction along the target travel route Pe.

The driver target lateral deviation calculation unit 112 calculates the driver target lateral deviation $\Delta y_{md}$ based on the following expression (15).

[Math 15]

$$\Delta y_{md} = \Delta y_{ad} + \frac{V_x}{\gamma_{d.\,model}}(1-\cos(t_s\ \gamma_{d,\,model})) \tag{15}$$

The driver target lateral deviation $\Delta y_{md}$ set by the driver target lateral deviation setting unit 61 is provided to the host ECU 201.

Figure 9:
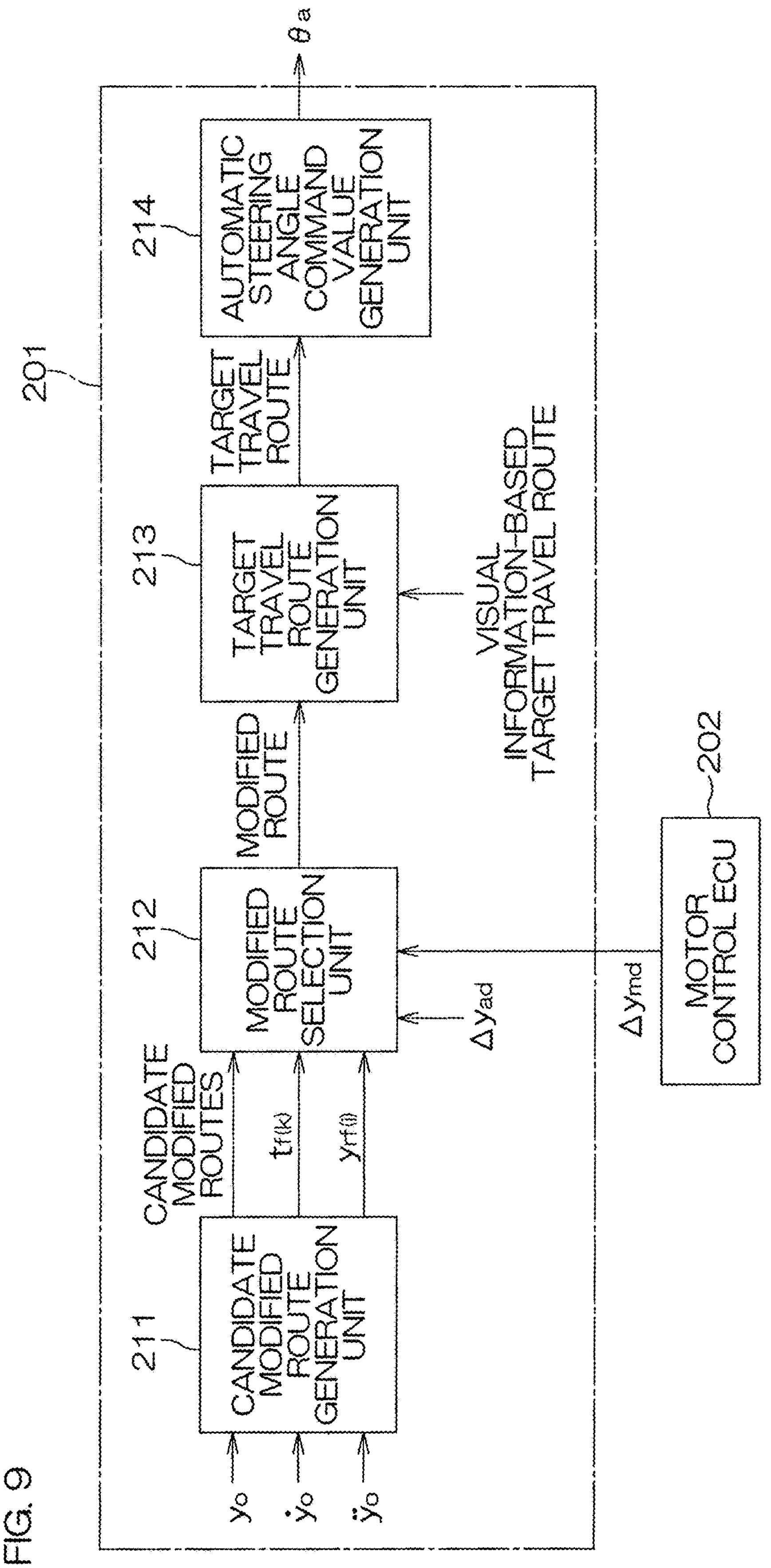
FIG. 9 is a block diagram showing the configuration of a host ECU for changing a target travel route mainly using a driver target lateral deviation $\Delta y_{md}$.

FIG. 9 is a block diagram showing the configuration of the host ECU 201 for changing the target travel route mainly using the driver target lateral deviation $\Delta y_{md}$.

The host ECU 201 includes a candidate modified route generation unit 211, a modified route selection unit 212, a target travel route generation unit 213, and an automatic steering angle command value generation unit 214. Although not shown in the figure, the host ECU 201 includes a lateral deviation calculation unit that calculates the current lateral deviation $\Delta y_{ad}$ from the visual information-based target travel route.

In the present embodiment, the candidate modified route generation unit 211 and the modified route selection unit 212 constitute the "modified travel route generation unit" in the present invention. The driver target lateral deviation calculation unit 112, the candidate modified route generation unit 211, the modified route selection unit 212, and the target travel route generation unit 213 constitute the "route change unit" in the present invention.

Figure 10:
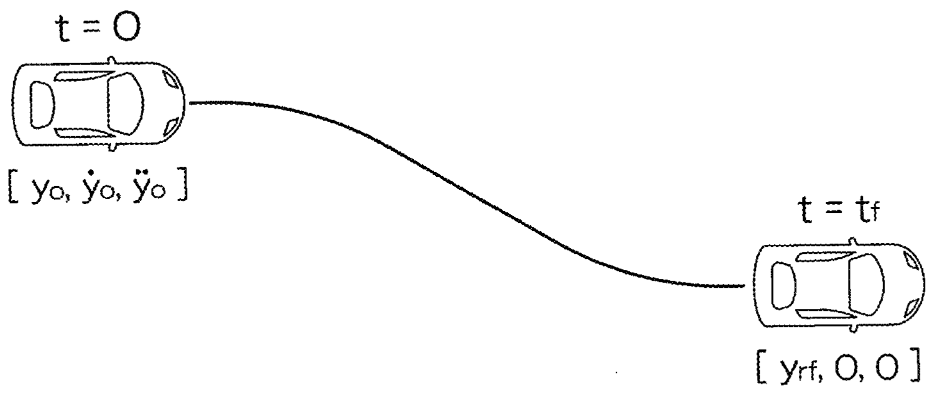
FIG. 10 is a schematic diagram illustrating the operation of a candidate modified route generation unit.

The operation of the candidate modified route generation unit 211 will be described. As shown in FIG. 10, when the current lateral location $y_0$, lateral velocity $dy_0/dt$, and lateral acceleration $d^2y_0/dt^2$ of the vehicle are measured and the lateral location $y_{rf}$ for completion time $t_f$ is determined, one candidate modified route is uniquely determined by the quintic function given by the following expression (16) by setting the lateral velocity and lateral acceleration for the completion time $t_f$ to 0.

[Math 16]

$$y_r(t) = a_0 + a_1t + a_2t^2 + a_3t^3 + a_4t^4 + a_5t^5 \tag{16}$$

$$[a_0\ a_1\ a_2\ a_3\ a_4\ a_5\ ]^j = ArBv$$

$$Ar = \begin{bmatrix} 1 & 0 & 0 & 0 & 0 & 0 \\ 0 & 1 & 0 & 0 & 0 & 0 \\ 0 & 0 & 2 & 0 & 0 & 0 \\ 1 & t_f & t_f^2 & t_f^3 & t_f^4 & t_f^5 \\ 0 & 1 & 2t_f & 3t_f^2 & 4t_f^3 & 5t_f^4 \\ 0 & 0 & 2 & 6t_f & 12t_f^2 & 20t_f^3 \end{bmatrix},\ B_v = \begin{bmatrix} y_{ro} \\ \dot{y}_{ro} \\ \ddot{y}_{ro} \\ y_{rf} \\ O \\ O \end{bmatrix}$$

In the present embodiment, the "modified route" means a route used to modify the visual information-based target travel route. The "candidate modified route" refers to a candidate for the "modified route." The current lateral location $y_0$, lateral velocity $dy_0/dt$, and lateral acceleration $d^2y_0/dt^2$ of the vehicle are calculated based on the previous value of a function y: (t) representing the modified route selected by the candidate modified route selection unit 212.

The candidate modified route generation unit 211 sets a plurality of completion times $t_f$ and a plurality of lateral locations $y_{rf}$ for the completion times tras given by the following expression (17), and calculates coefficients $a_0$, $a_1$, $a_2$, $a_3$, $a_4$, and as of the quintic function for each combination of the completion time $t_f$ and the lateral location $y_{rf}$.

[Math 17]

$$y_{rf}(i) = i \cdot W, i \in \{-N, \ldots, -1, 0, 1, \ldots, N\} \quad (17)$$
$$t_f(k) = k \cdot \Delta t, k \in \{1, \ldots, M\}$$

In expression (17), W is a preset length in the lateral direction (i.e., direction perpendicular to the direction along the visual information-based target travel route), and Δt is a preset time.

Figure 11:
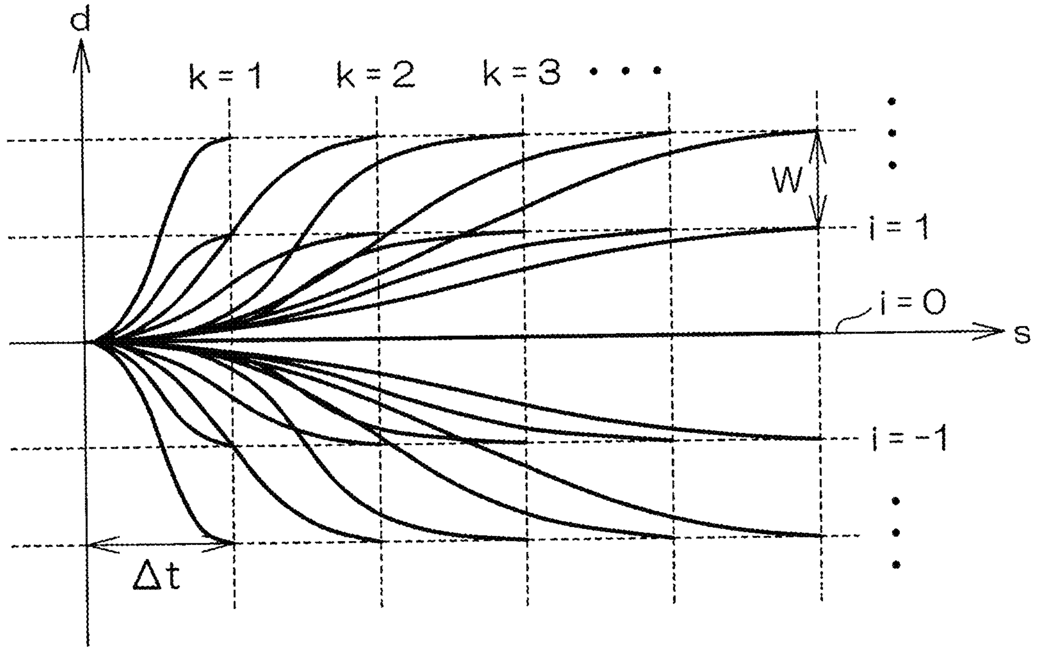
FIG. 11 is a schematic diagram showing an example of candidate modified routes.

A plurality of candidate modified routes are thus generated as shown in FIG. 11. For example, when i is set to the five values −2, −1, 0, 1, and 2 and k is set to the five values 1, 2, 3, 4, and 5 in expression (17), 25 candidate modified routes are generated.

The modified route selection unit 212 selects an optimal candidate modified route as a modified route from the plurality of candidate modified routes generated by the candidate modified route generation unit 211.

The modified route selection unit 212 first calculates cost $J_y(i, k)$ for each of the plurality of candidate modified routes based on a jerk that is a derivative value of the lateral acceleration $d^2y_r/dt^2$ of the vehicle when the vehicle follows the candidate modified route, according to the following expression (18).

[Math 18]

$$J_y(i, k) = \int_0^{tf(k)} \dddot{y}_r(t)^2 dt = 12\, t_f\left(3a_3^2 + 12a_3a_4t_f + 16a_4^2t_f^2\right) + 20a_3a_5t_f^2 + 60a_5t_f^3(a_4 + a_5t_f)\big) \quad (18)$$

Coefficients $a_0$, $a_1$, $a_2$, $a_3$, $a_4$, and as corresponding to (i, k) in $J_y(i, k)$ on the left side of expression (18) and obtained by the above expression (16) are used as the coefficients $a_0$, $a_1$, $a_2$, $a_3$, $a_4$, and as on the right side of expression (18). Also, $t_f$ (k) in the above expression (17) corresponding to k in $J_y(i, k)$ on the left side is used as $t_f$.

The modified route selection unit 212 then generates, as given by the following expression (19), for each of the plurality of candidate modified routes, a cost function $C_y(i, k)$ from the cost $J_y(i, k)$ according to the jerk, the completion time $t_f$ (k), the difference between the lateral location $y_{rf}(i)$ and the lateral deviation $\Delta y_{ad}$, and the difference between the lateral location $y_{rf}$ (i) and the lateral deviation $\Delta y_{md}$.

[Math 19]

$$C_y(i, k) = k_J J_y(i, k) + k_{tf} t_f(k) + k_{ad}(y_{rf}(i) - \Delta y_{ad})^2 + k_{md}(y_{rf}(i) - \Delta y_{md})^2 \quad (19)$$

In expression (19), $k_j$, $k_t$, $k_{ad}$, and $k_{md}$ are preset weights. The completion time $t_f(k)$ decreases as the cost $J_y(i, k)$ according to the jerk increases. Therefore, the cost $J_y(i, k)$ according to the jerk and the completion time $t_f(k)$ have a trade-off relationship. The ride comfort may decrease as the cost $J_y(i, k)$ according to the jerk increases. However, the completion time increases as the cost $J_y(i, k)$ according to the jerk decreases. In expression (19), $(y_{rf}(i)-\Delta y_{ad})$ is the difference between the candidate modified route and the target value of driver assistance, and $(y_{rf}(i)-\Delta y_{md})$ is the difference between the candidate modified route and the target value of manual driving.

It is preferable that the modified route have a small jerk, a quick completion time, a small value of $(y_{rf}(i)-\Delta y_{ad})^2$, and a small value of $(y_{rf}(i)-\Delta y_{md})^2$.

Therefore, the modified route selection unit 212 selects a candidate modified route with the smallest cost function $C_y(i, k)$ as an optimal modified route from the plurality of candidate modified routes.

The target travel route generation unit 213 generates a final target travel route by modifying the visual information-based target travel route based on the modified route selected by the modified route selection unit 212.

Figure 12:
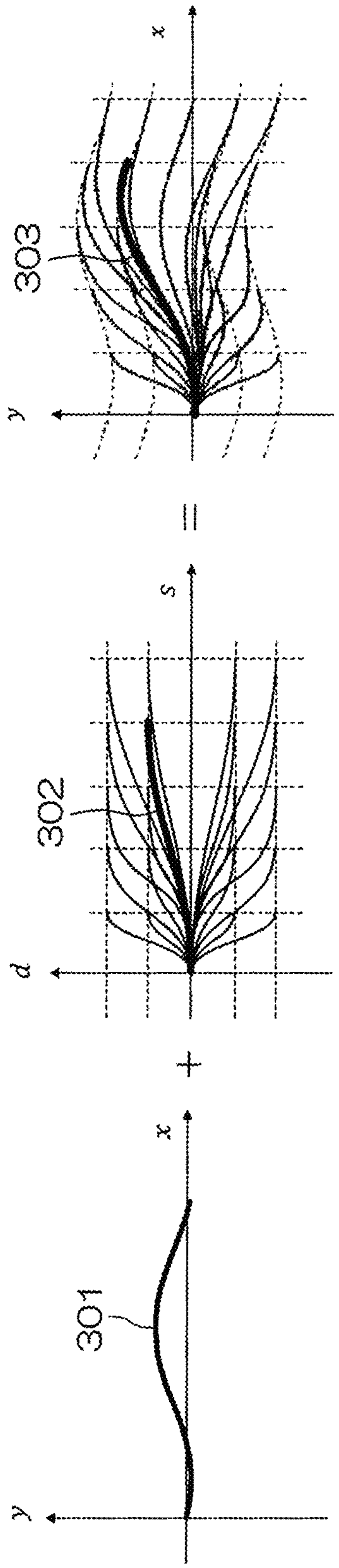
FIG. 12 is a schematic diagram illustrating the operation of a target travel route generation unit.

Specifically, as shown in FIG. 12, the target travel route generation unit 213 generates a final target travel route 303 by adding a modified route 302 selected by the modified route selection unit 212 to a visual information-based target travel route 301. As shown in FIG. 12, the visual information-based target travel route 301 is shown in a coordinate system with the x-axis representing the location in the front-rear direction of the vehicle and the y-axis representing the location in the right-left direction of the vehicle. FIG. 12 shows an example in which a candidate modified route corresponding to k=4 and i=1 is selected as a modified route.

The automatic steering angle command value generation unit 214 generates the automatic steering angle command value $\theta_a$ for moving the vehicle along the target travel route generated by the target travel route generation unit 213.

When the driving mode is the normal mode, an assist torque command value setting unit (not shown in FIG. 2) in the motor control ECU 202 sets an assist torque command value using the torsion bar torque $T_{tb}$. The torque control unit 60 drives the drive circuit 41 based only on the assist torque command value.

In the above embodiment, the reaction force control gains $k_a$, $c_a$ are set based on the driver target steering angle estimation unit 53. Therefore, it is possible to perform steering control that sufficiently reflects the driver's intentions when in the driver assist mode.

Moreover, in the above embodiment, the visual information-based target travel route can be modified (target travel route can be changed) based on the driver target lateral deviation $\Delta y_{md}$ set by the driver target lateral deviation setting unit 61. Therefore, it is possible to perform steering control that sufficiently reflects the driver's intentions when in the driver assist mode. As a result, it is possible to create an appropriate state of interaction between the driver and the system.

Although the embodiment of the present invention is described above, the present invention may also be implemented in other forms. For example, in the above embodiment, the driver torque control gain estimation unit 54 estimates both the spring constant $k_d$ and the viscous damping coefficient $c_d$ based on the driver target steering angle $\hat{\theta}_d$, the pinion angle $\theta_p$, and the torsion bar torque $T_{tb}$. However, the driver torque control gain estimation unit 54 may estimate only one of the spring constant $k_d$ and the viscous damping coefficient $c_d$. In that case, the estimated value of the driver torque control gain is reflected only in the reaction force control gain corresponding to one driver torque control gain estimated by the driver torque control gain estimation unit 54 out of the reaction force control gains $k_d$, $c_d$.

In the above embodiment, the reaction force control gain calculation unit 55 (see FIG. 2) calculates the reaction force control gains $k_d$, $c_d$ based on the driver torque control gains $\hat{k}_d$, $\hat{c}_d$ and the weighting factor κ provided from the host ECU 201. However, the weighting factor κ may be a fixed value preset in the motor control ECU 202.

In the above embodiment, the angle control unit 59 (see FIG. 2) includes the feedforward control unit 73. However, the feedforward control unit 73 may be omitted. In this case, the feedback control torque $T_{fb}$ calculated by the feedback control unit 72 is basic target torque.

The above embodiment illustrates an example in which the present invention is applied to a column type EPS. However, the present invention is also applicable to EPSs other than the column type. The present invention is also applicable to a steer-by-wire system.

Although the embodiment of the present invention is described in detail above, this is merely a specific example used to clarify the technical content of the present invention. The present invention should not be construed as being limited to the specific example, and the scope of the present invention is limited only by the appended claims.

DESCRIPTION OF THE REFERENCE NUMERALS

1 . . . electric power steering system, 3 . . . steered wheel, 4 . . . steering operation mechanism, 18 . . . electric motor, 53 . . . driver target steering angle estimation unit, 54 . . . driver torque control gain estimation unit, 55 . . . reaction force control gain calculation unit, 56 . . . reaction force setting unit, 57 . . . manual steering angle command value calculation unit, 58 . . . integrated angle command value calculation unit, 59 . . . angle control unit, 60 . . . torque control unit, 61 . . . driver target lateral deviation setting unit, 111 . . . yaw rate calculation unit, 112 . . . driver target lateral deviation calculation unit, 201 . . . host ECU, 202 . . . motor control ECU, 211 . . . candidate modified route generation unit, 212 . . . modified route selection unit, 213 . . . target travel route generation unit, 214 . . . automatic steering angle command value generation unit

The invention claimed is:

1. A steering system comprising:

an electric motor for steering angle control;

a manual steering angle command value calculation unit that calculates a manual steering angle command value based on an equation of motion including steering torque and a reaction force control gain;

an integrated angle command value calculation unit that calculates an integrated angle command value by adding the manual steering angle command value to an automatic steering angle command value for driver assistance;

a control unit that performs angle control on the electric motor based on the integrated angle command value; and a reaction force control gain setting unit that sets the reaction force control gain using the steering torque, vehicle information, and road information.

2. The steering system according to claim 1, wherein the reaction force control gain setting unit includes a driver target steering angle estimation unit that estimates a driver target steering angle using the steering torque, the vehicle information, and the road information, and a reaction force control gain calculation unit that calculates the reaction force control gain using the driver target steering angle.

3. The steering system according to claim 1, wherein the reaction force control gain setting unit includes a driver target steering angle estimation unit that estimates a driver target steering angle using the steering torque, the vehicle information, and the road information, a driver torque control gain estimation unit that estimates a driver torque control gain using the driver target steering angle, the steering torque, and a rotation angle of the electric motor, and a reaction force control gain calculation unit that calculates the reaction force control gain using the driver torque control gain.

4. The steering system according to claim 1, wherein the vehicle information is a vehicle speed, and the road information is a curvature of a road.

5. The steering system according to claim 1, further comprising a route change unit that changes a target travel route for use in calculation of the automatic steering angle command value using the steering torque or the manual steering angle command value and the vehicle information.

6. The steering system according to claim 5, wherein the route change unit includes a driver target lateral deviation calculation unit that calculates a driver target lateral deviation after a predetermined time using the steering torque or the manual steering angle command value and the vehicle information, a modified travel route generation unit that generates a modified travel route using the driver target lateral deviation and a lateral deviation after the predetermined time from a visual information-based target travel route, and a target travel route generation unit that generates a final target travel route by modifying the visual information-based target travel route based on the modified travel route.

* * * * *